May 16, 1967 J. L. LOHMAN 3,320,566
ELECTRIC COILS AND LEAD-IN CONNECTORS
Filed Nov. 5, 1965

Inventor
Joseph L. Lohman
By Robert C. Benson
Attorney

United States Patent Office 3,320,566
Patented May 16, 1967

3,320,566
ELECTRIC COILS AND LEAD-IN CONNECTORS
Joseph L. Lohman, Pittsburgh, Pa., assignor to Allis-Chalmers Manufacturing Company, Milwaukee, Wis.
Filed Nov. 5, 1965, Ser. No. 506,545
6 Claims. (Cl. 336—192)

ABSTRACT OF THE DISCLOSURE

A lead-in connector for a sheet wound electrical coil comprises a plurality of juxtaposed and overlapping strips of conductive material extending transverse to the longitudinal axis of the sheet and having staggered ends cold welded to the sheet at areas in alignment in a direction transverse to the longitudinal axis of the sheet to minimize the thickness of the portions of the lead-in connector cold welded to the sheet while maintaining adequate total cross sectional area of the connector for conduction of high magnitude currents.

---

Figure 1:
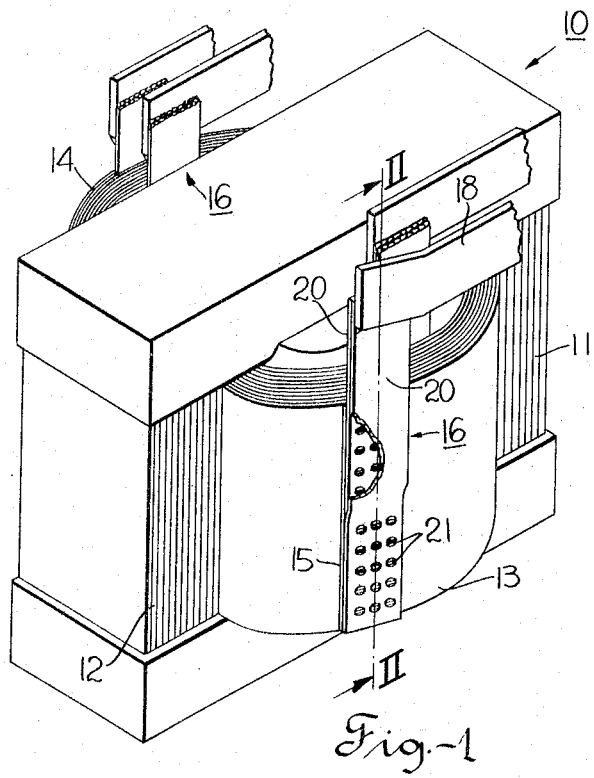

This invention relates generally to electrical coils. More specifically, this invention relates to coils such as used in transformers and leads used with such electrical coils that are formed by sheets of thin flat conducting members. These coils are frequently referred to as sheet, strip, or foil wound coils.

It is common in the industry to attach the leads to the sheet material of such sheet or foil coils by cold or pressure welding. As the current rating of the coil increases, the cross-sectional areas of both the sheet conductor and the coil leads must also increase in order to keep the coil power losses and coil heating within acceptable limits. In the coil, this increase in cross-sectional area is usually accomplished by increasing the conductor width and/or thickness. However because of the limitation imposed on the thickness of the sheet material so that it will still be flexible enough to form an oval or rectangular coil, the increase cross-sectionally is most usually accomplished by increasing the width of the strip. A corresponding increase in cross-section must also be provided in the leads. However because of the curvature or configuration of the coil, there are definite limitations on how wide the leads can be made. The natural inclination is to increase the thickness of the leads, and retain a relatively narrow width. However this creates a further problem in connecting the leads to the sheet or foil conductor material.

The physical size of the indentors used in the cold welding process is dictated by the thickness of the parts and the materials to be welded, whether they be similar or dissimilar materials. As the thickness of the parts to be joined increases, the indentors must increase in size or area. With conductor cross-sections increasing, the thickness of the top or indented material becomes a greater portion of the total thickness of the two welded materials. The indentors must also become larger if the hardness of the top material is greater than the hardness of the bottom material, such as a top material of copper and a bottom material of pure aluminum. As the cold welding indentors become larger in area, and the thickness of the materials to be welded becomes greater, the amount of material which must be displaced from the weld area in order to effect a sound weld may become very large and may amount to 80% or 85% reduction in the thickness of the materials being joined. The amount of pressure required to produce this much of a reduction may be great enough to cause excessive and objectionable distortion in the weld area. This distortion of the base materials, particularly of the softer of two dissimilar materials, may become so great that welds previously made in a series of successive welds may be ruptured.

This invention overcomes the welding problem mentioned above by providing a laminated lead-in which the lower portion of each lamination is individually connected to the coil sheet and the outer portions of the laminations are connected together to form the lead-in for the coil. In this way, the very thin lamination may be easily connected to the sheet material by cold welding but the increased cross-sectional areas for carrying current is provided by joining the several laminations together at their outer ends. In this way the ratio of lead thickness to coil sheet conductor thickness can be held within acceptable limits and the thinner laminated parts of the lead-in member can be easily formed into a single thicker member to carry the current. With this invention, the size of the equipment required for cold welding the lead-in connector to the coil can be smaller and hence within more economical limits. Furthermore, the size of the indentors required for cold welding the parts can be held to a minimum, thereby assuring a good connection between the lead-ins and the coil conductor without excessive distortion which could increase the hazards of a possible break or rupture in the welds.

Therefore, it is the object of this invention to provide a new and improved foil or sheet coil for use in electrical apparatus.

Another object of this invention is to provide a new and improved lead-in connection for foil or sheet coils.

Figure 2:
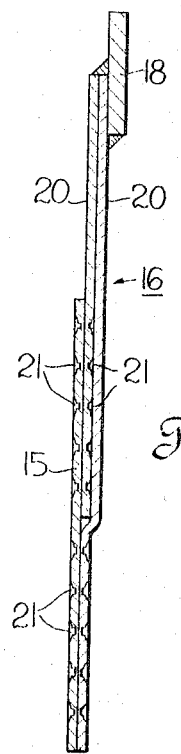

Other objects and advantages of this invention will be apparent from the following description when read in connection with the accompanied drawings in which:

FIG. 1 is an isometric view of a transformer core and coil using the laminated lead-in connection of this invention, and FIG. 2 is an enlarged cross-section view of the lead-in connection taken along the line II—II of FIG. 1.

Referring more particularly to the drawings by characters of reference, the invention is illustrated in connection with a transformer 10 having a pair of wound magnetic cores 11, 12 and a coil positioned in the openings of said cores. The illustrated cores are what is known in the art as wound cores made of relatively thin sheets of magnetic material usually grain-oriented steel. The coil is actually made up of the primary coil 13 and a secondary coil 14. The coils are formed of very thin sheets 15 of electric conducting material such as aluminum or copper, and are frequently referred to in the electrical industry as foil coils. As illustrated, the primary and secondary coils may be spirally wound in alternate layers and around the same legs of the cores 11, 12.

Each coil 13, 14 is provided with two lead-in connections 16. One connector is attached to each end of the sheet forming the coil. The illustrated lead-in connectors 16 are made up of a pair of thin overlapping conductor strips or laminations 20 connected at their inner ends to the end of the foil sheets 15 and at their outer end to a bus bar 18. The connections of the lead-in strips 20 to the coil sheets 15 can be made in any suitable way but are preferably made by a cold welding process. With a cold welding process, the lead-in strips 20 and the coil sheets 15 are joined by a plurality of indentations 21 which are formed under great pressure to weld the lead-in strips to the foil material of the coil. The strips 20 of each connector partially overlap each other and are joined at their outer end to a common bus bar. Hence the current carrying capacity of the lead-in connectors 16 is the sum of the cross-sectional area of both strips 20 rather than a single strip. On the other hand, the relatively thin dimension of the lead-in strip provides a convenient way of cold welding the lead-in to the coil sheet.

Although only two lead-in strips are illustrated for each lead-in connection, this invention is intended to cover any number of lead-in strips for each connector. In each case, the strips would be at least partially overlapping one another and be joined at the inner end to the coil and at the outer end to a common bus bar. As mentioned above, the purpose of forming the lead-in connector of a plurality of strips is to provide the required cross-sectional area in the connector for the current carrying capacity needed but at the same time to provide thin material that can be advantageously cold welded to the thin sheet of the foil coil.

In the preferred embodiment illustrated in the drawings the lead-in connectors 16 extend transverse to the longitudinal direction of the sheets 20 of the foil coils. The width of the strips 20 of the lead-in connector 16 are determined in accordance with the conditions under which the coil will operate so as to provide a sufficient overall cross-sectional area for carrying the maximum current in the coil.

Although but one embodiment of this invention has been illustrated and described, it will be apparent to those skilled in the art that various modifications and changes can be made therein without departing from the spirit of the invention or the scope of the appended claims.

The embodiments of the invention in which an exclusive property or privilege is claimed are defined as follows:

1. In combination with a coil made up of a thin sheet of electric conducting material spirally wound to form a substantially cylindrical coil, a lead-in connector comprising
   a plurality of elongated juxtaposed layers of thin electric conducting material extending parallel to and overlapping each other and forming staggered ends adjacent at least one extremity thereof, said layers being attached at their staggered ends to said sheet and at their other extremity to each other.

2. A coil for an electric induction machine comprising
   a sheet of electric conducting material spirally wound to form a substantially cylindrical coil,
   a plurality of lead-in connectors,
   each said lead-in connector comprising a plurality of juxtaposed thin strips of electric conducting material extending parallel to each other and having their ends staggered adjacent one terminus, each of said strips being connected at said staggered end to a portion of said sheet and at the other end to each other.

3. The coil of claim 2 in which said strips extend transverse to said sheet.

4. In the combination defined by claim 1 wherein said layers are transverse to the longitudinal axis of said sheet and are cold welded at said staggered ends to said sheet.

5. In the combination defined by claim 4 wherein said staggered ends of said plurality of layers are cold welded to said sheet at areas approximately in alignment in a direction transverse to the longitudinal axis of said sheet.

6. In the combination defined by claim 5 wherein each said staggered end of the longer of said layers is bent over and lies in the same plane as the shortest of said staggered ends.

References Cited by the Examiner

UNITED STATES PATENTS

| | | | |
|---|---|---|---|
| 2,445,587 | 7/1948 | Sims | 336—192 |
| 2,963,669 | 12/1960 | Salisbury | 336—192 |
| 3,153,216 | 10/1964 | Klitten | 336—192 X |
| 3,191,103 | 6/1965 | Segall | 336—192 X |

LEWIS H. MYERS, *Primary Examiner.*

E. GOLDBERG, *Assistant Examiner.*